(12) United States Patent
Chung et al.

(10) Patent No.: US 11,097,240 B2
(45) Date of Patent: Aug. 24, 2021

(54) PICKERING EMULSION COMPOSITION USING POLYIMIDE PARTICLES AND PREPARATION METHOD THEREOF

(71) Applicants: UNIVERSITY INDUSTRY FOUNDATION, YONSEI UNIVERSITY WONJU CAMPUS, Wonju-si (KR); RESEARCH & BUSINESS FOUNDATION SUNGKYUNKWAN UNIVERSITY, Suwon-si (KR)

(72) Inventors: Chan Moon Chung, Wonju-si (KR); Kwang Myong Lee, Seoul (KR); Yu Jin Cho, Seoul (KR); Ju Young Choi, Wonju-si (KR); Beom Jun Kim, Hwaseong-si (KR); Jin Won Jeong, Gwangmyeong-si (KR); Dong Min Kim, Samcheok-si (KR)

(73) Assignees: UNIVERSITY INDUSTRY FOUNDATION, YONSEI UNIVERSITY WONJU CAMPUS, Gangwon-Do (KR); RESEARCH & BUSINESS FOUNDATION SUNGKYUNKWAN UNIVERSITY, Gyeonggi-Do (KR)

( * ) Notice: Subject to any disclaimer, the term of this patent is extended or adjusted under 35 U.S.C. 154(b) by 30 days.

(21) Appl. No.: 16/305,713

(22) PCT Filed: Nov. 10, 2017

(86) PCT No.: PCT/KR2017/012738
§ 371 (c)(1),
(2) Date: Nov. 29, 2018

(87) PCT Pub. No.: WO2018/236003
PCT Pub. Date: Dec. 27, 2018

(65) Prior Publication Data
US 2020/0078753 A1 Mar. 12, 2020

(30) Foreign Application Priority Data
Jun. 19, 2017 (KR) ........................ 10-2017-0077212

(51) Int. Cl.
*B01F 17/00* (2006.01)
*B01F 3/08* (2006.01)
*C08G 73/10* (2006.01)

(52) U.S. Cl.
CPC .......... *B01F 17/005* (2013.01); *B01F 3/0819* (2013.01); *C08G 73/1067* (2013.01); *C08G 73/1078* (2013.01); *B01F 2003/0842* (2013.01); *B01F 2003/0846* (2013.01)

(58) Field of Classification Search
CPC .. B01F 17/005; B01F 3/0819; C08G 73/1067; C08G 73/1078
See application file for complete search history.

(56) References Cited

U.S. PATENT DOCUMENTS

2018/0141015 A1* 5/2018 Choi ................... B01F 17/0028

FOREIGN PATENT DOCUMENTS

| JP | 639259 A | 2/1994 |
|---|---|---|
| JP | 7300524 A | 11/1995 |
| KR | 10-0550967 B1 | 2/2006 |
| KR | 10-1547528 B1 | 8/2015 |
| KR | 10-2016-0137820 A | 12/2016 |
| KR | 10-1728823 B1 | 4/2017 |
| KR | 10-1757245 B1 | 7/2017 |
| WO | 2011058881 A1 | 5/2011 |

OTHER PUBLICATIONS

KR 2017-0013544 machine translation (Year: 2017).*
KR 2017-0006586 machine translation (Year: 2017).*

* cited by examiner

*Primary Examiner* — Edward J Cain
(74) *Attorney, Agent, or Firm* — Novick, Kim & Lee, PLLC; Jae Youn Kim

(57) ABSTRACT

The present invention relates to a pickering emulsion composition using polyimide particles and a method for preparing the same. The pickering emulsion stabilized by the polyimide particles according to the present invention has a very stable dispersed phase and does not cause flocculation, creaming, coalescence and phase separation even after a long time, and has an advantage of being capable of forming both an oil-in-water type emulsion and a water-in-oil type emulsion. Further, the polyimide particles used in the present invention can be synthesized in a simple manner and have partial wettability without the surface treatment and pH control so that they can be easily used for the emulsion stabilization.

8 Claims, 2 Drawing Sheets

PICKERING EMULSION COMPOSITION USING POLYIMIDE PARTICLES AND PREPARATION METHOD THEREOF

TECHNICAL FIELD

The present invention relates to a pickering emulsion composition using polyimide particles and a method for preparing the same.

The pickering emulsion stabilized by the polyimide particles according to the present invention has a very stable dispersed phase and does not cause flocculation, creaming, coalescence and phase separation even after a long time, and has an advantage of being capable of forming both an oil-in-water type emulsion and a water-in-oil type emulsion.

Further, the polyimide particles used in the present invention can be synthesized in a simple manner and have partial wettability without the surface treatment and pH control so that they can be easily used for the emulsion stabilization.

BACKGROUND ART

Emulsion refers to a liquid-liquid dispersion system in which another liquid's fine particles which are hardly dissolved in a liquid medium are dispersed in the liquid medium. A system in which oil fine particles are dispersed in water is referred as to an oil-in-water type (o/w type) emulsion, and vice versa is referred as to a water-in-oil type (w/o type) emulsion. The emulsion is used as it is, or it can be used as a template to produce a porous material or a capsule, and thus it is utilized in various industrial fields.

However, since emulsion is thermodynamically unstable, the emulsion dispersion system may eventually be destroyed by a path such as flocculation, creaming, coalescence and phase separation. In order to prevent this issue, an emulsifier or the like should be used to maintain the emulsion stable.

The emulsifier contains both a hydrophilic group and an oleophilic group at the same time. Thus, it forms an adsorbed layer on the interface between water and oil phase, thereby maintaining the emulsion system in a stable state. Emulsifier consisting of a compound having a small molecular weight or a polymer forms an aggregate in an aqueous solution or an organic solvent or the like so that it is widely used for producing an emulsion.

However, in the case of low molecular weight and high molecular weight emulsifiers, it is disadvantageous that it is difficult to control the size of the dispersion droplets when an excess amount is added, it is not easy to wash and remove the added emulsifier, and different emulsifiers should be selected depending on the core material to be used.

In order to address this issue, solid particles such as calcium carbonate, silica, clay, laponite, graphite, latex, magnetic particle, and carbon nanotube (CNT) are used, and solid particles are attached to the interface between two phases, thereby facilitate stabilized pickering emulsion.

In order to stabilize the pickering emulsion using a variety of organic or inorganic particles, the solid particles must remain partially wet across the interface between the water phase and the oil phase. For this purpose, a complex chemical surface treatment, that is, a surface modification process is often performed. Through this process, the degree of hydrophobicity of the solid particle surface is controlled to enable irreversible interface adsorption of particles. For the surface modification, chemical grafting is used to chemically bond organic molecules to the solid surface, or physical adsorption is mainly used.

For example, silica particles with hydrophilic surfaces are difficult to form pickering emulsions but can be used in the production of pickering emulsions through hydrophobic surface treatment by grafting of organosilanes.

However, since the balance of the hydrophilic-oleophilic properties controlled by the surface treatment is fragile due to changes in the surrounding environment, such as changes in pH, changes in the concentration of core materials, and changes in bonding strength with grafted molecules. Accordingly, the conditions of the emulsion stabilization must be adjusted according to various kinds of particles. Therefore, pickering emulsion has limitations in various commercial applications.

Meanwhile, as another of the conventional pickering emulsion techniques, Korean Patent Publication No. 2017-0013544 discloses a techniques for pickering emulsion including 0.01% by weight to 20% by weight of particles having an average particle diameter of 10 nm to 100 μm and 0.01% by weight to 20% by weight of a non-ionic water-soluble polymer with respect to the total emulsion weight and having a form in which the particles are located on the surface of oil droplets and a method of preparing the same. However, this technique has a limitation that it must be prepared by essentially including particles having a specific average particle size range and non-ionic water-soluble polymers and that it is only possible to manufacture an oil-in-water type emulsion.

There are other techniques such as Korean Patent Publication No. 2016-0137820 disclosing a method for producing thermal-expansion microcapsules using pickering emulsion other than a surfactant or a polymeric steric stabilizer, Korean Patent No. 10-1547528 disclosing a technique for a water-in-oil type pickering emulsion in which an oil phase portion includes a polymethylmethacrylate powder and silica powder as particulate materials instead of emulsifiers, and Korea Patent No. 10-0550967 disclosing a technique for a water-in-oil composition including silica silylate instead of emulsifiers in oil phase component, thereby providing excellent long-term storage stability, no-skin irritation due to emulsifiers and excellent usability when applied to skin.

However, these methods are complicated in the manufacturing process and do not disclose a method of preparing both an oil-in-water type and a water-in-oil type pickering emulsions which has a stable dispersion phase.

Therefore, it is required to develop a particulate material which can be used for a method of preparing both an oil-in-water type and a water-in-oil type pickering emulsions while the material does not require the surface treatment, which makes it easy to manufacture, and the pickering emulsion is maintained stably without being sensitive to the pH condition or the type of core materials.

SUMMARY OF INVENTION

Technical Problem

The present invention is to provide a pickering emulsion composition and a method of preparing the same in which the surface treatment is not required to make it easy to manufacture, and the pickering emulsion is maintained stably without being sensitive to the pH condition or the type of core materials.

Solution to Problem

The present invention addresses the issues by providing a pickering emulsion composition in which polyimide particles surrounds droplets of dispersion phase which is a water phase or an oil phase.

The pickering emulsion stabilized by the polyimide particles according to the present invention has a very stable dispersion phase and does not cause flocculation, creaming, coalescence and phase separation even after a long time. The polyimide particles can be synthesized by a simple method and have partial wettability without the surface treatment and pH adjustment, thus can be easily used for emulsion stabilization.

In one aspect of the present invention, the emulsion may be prepared in the form of both water-in-oil type and oil-in-water type emulsions.

In one aspect of the present invention, the polyimide is synthesized by using water as a dispersion medium. When the polyimide is synthesized without using water as a dispersion medium, for example, when the polyimide synthesized using an organic solvent as a dispersion medium is used for the preparation of pickering emulsion, the polyimide particles do not uniformly disperse in the continuous phase and sink, which is undesirable.

More specifically, the polyimide is prepared by dispersing a dianhydride compound and a diamine compound in water and then reacting.

In one aspect of the present invention, the dianhydride compound may be one selected from, but not limited to, dianhydride compounds having the following structure:

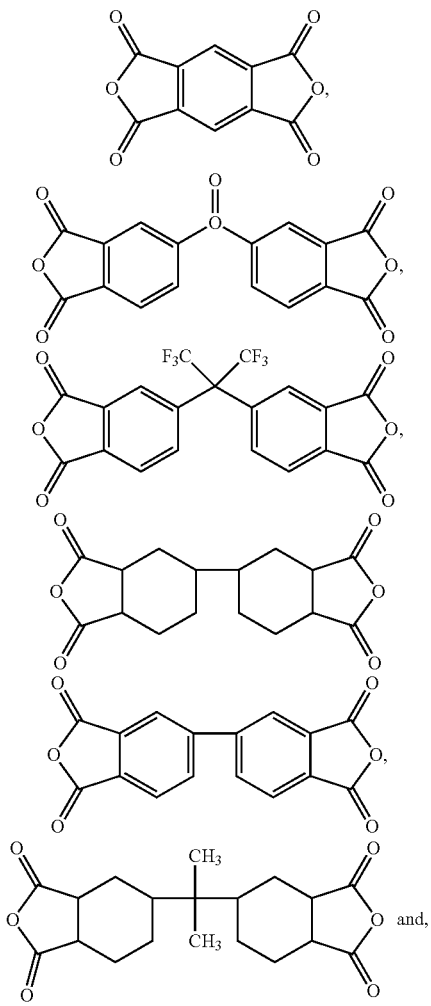

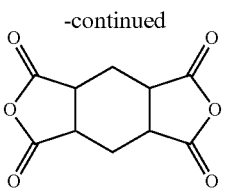

In one aspect of the present invention, the diamine compound may be one selected from, but not limited to, diamine compounds having the following structure:

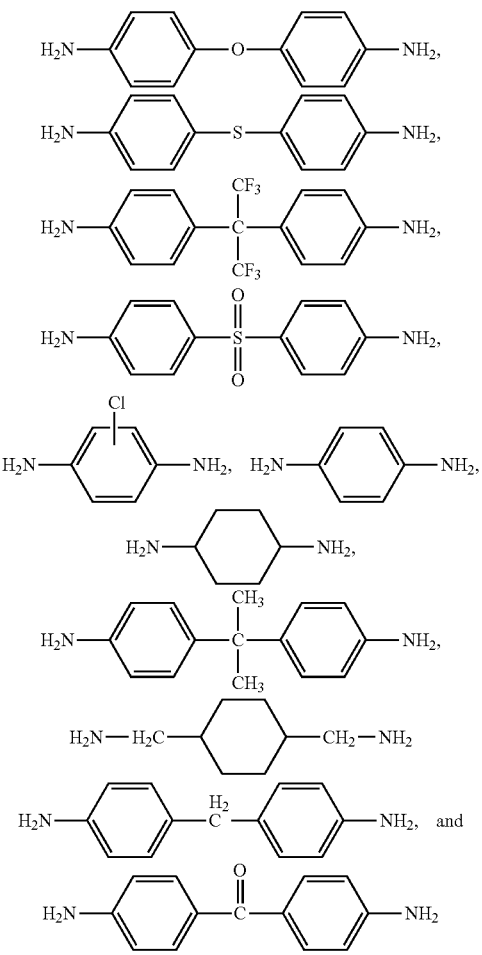

In one aspect of the present invention, for example, the polyimide may be prepared by dispersing dianhydride and diamine in distilled water as a dispersion medium in a flask which is substituted with a nitrogen gas, adding a catalyst and a dehydrating agent thereto, then reacting the mixture while refluxing the same at about 100° C. for about 24 hours. A polyimide powder may be obtained by filtering the reaction mixture, washing the same with distilled water, acetone, methanol or the like, and vacuum-drying the obtained solid.

In one aspect of the present invention, the polyimide particles may have an average particle diameter of 10 nm to 20 μm, more specifically 50 nm to 15 μm, and far more particularly 100 nm to 10 μm. When the polyimide particle size is not controlled within the aforementioned range, the polyimide particles may not be uniformly dispersed in the continuous phase, resulting in a problem that the pickering emulsion is not stabilized. The use of the particles having the average particle diameter may be effective in stabilizing the dispersed phase by suppressing the phase separation.

In one aspect of the present invention, after the polyimide synthesis, ultrasonic waves may be applied to the polyimide particles so that the polyimide particles are adjusted to have an average particle diameter of 10 nm to 20 μm.

In one aspect of the present invention, the ultrasonic waves may be in the range of 20 kHz to 100 kHz, more specifically 20 kHz to 40 kHz, and may be applied for a duration of about 10 minutes to about 120 minutes, more specifically about 15 minutes to about 100 minutes, far more specifically about 20 minutes to about 80 minutes, far more specifically about 25 minutes to about 60 minutes, and far more specifically about 30 minutes, to obtain polyimide particles having an appropriate diameter.

In one aspect of the invention, the average particle diameter of the water droplets or oil droplets may be in the range of about 1 μm to about 1,000 μm, more specifically about 5 μm to about 800 μm, far more specifically about 10 μm to about 600 μm, far more specifically about 20 μm to about 400 μm, and far more specifically about 40 μm to about 300 μm.

In one aspect of the present invention, the pickering emulsion according to the present invention may maintain at least 1 day, at least 2 days, at least 3 days, at least 4 days, at least 5 days, at least 6 days, at least 7 days, at least 2 weeks, at least 3 weeks, and at least 4 weeks.

In another aspect of the present invention, provided is a method of preparing a pickering emulsion composition, the method including: (a) dispersing and reacting a dianhydride compound and a diamine compound in water as a dispersion medium to obtain a polyimide; (b) putting the polyimide obtained in step (a) into a water phase which is a continuous phase and applying ultrasonic waves thereto; and (c) adding and stirring an oil phase to the dispersion obtained in step (b).

In another aspect of the present invention, provided also is a method of preparing a pickering emulsion composition, the method including: (a) dispersing and reacting a dianhydride compound and a diamine compound in water as a dispersion medium to obtain a polyimide; (b) putting the polyimide obtained in step (a) into an oil phase which is a continuous phase and applying ultrasonic waves thereto; and (c) adding and stirring a water phase to the dispersion obtained in step (b).

In one aspect of the present invention, the pickering emulsion according to one example has a form in which the oil droplets are dispersed in the water phase, that is, it may be an oil-in-water type pickering emulsion in which the oil phase is a dispersed phase, and the water phase is a continuous phase.

In one aspect of the present invention, the pickering emulsion according to one example has a form in which the water droplets are dispersed in the oil phase, that is, it may be a water-in-oil type pickering emulsion in which the water phase is a dispersed phase, and the oil phase is a continuous phase.

Therefore, there is an advantage that both an oil-in-water type and a water-in-oil type emulsion can be formed according to the production method of the present invention.

In one aspect of the present invention, in step (b), the ultrasonic waves may be in the range of 20 kHz to 100 kHz, more specifically 20 kHz to 40 kHz, and may be applied for a duration of about 10 minutes to about 120 minutes, more specifically about 15 minutes to about 100 minutes, far more specifically about 20 minutes to about 80 minutes, far more specifically about 25 minutes to about 60 minutes, and far more specifically about 30 minutes, to obtain polyimide particles having an appropriate diameter.

In step (c), the polyimide particles in the dispersion obtained in step (b) have an average particle diameter of 10 nm to 20 μm, more specifically 50 nm to 15 μm, and far more particularly 100 nm to 10 μm. When the polyimide particle size is not controlled within the aforementioned range, the polyimide particles may not be uniformly dispersed in the continuous phase, resulting in a problem that the pickering emulsion is not stabilized.

In one aspect of the present invention, mixing can be performed by a method such as mechanical stirring, ultrasonic emulsification, high-pressure homogenization, high-speed shearing or microfluidizer. For example, in the case of mechanical stirring, the mixture can be stirred at 500 rpm to 5,000 rpm, more specifically 1,000 rpm to 2,500 rpm, far more specifically 1,100 rpm to 1,800 rpm, 1,200 rpm to 1,700 rpm and 1,300 rpm to 1,600 rpm. The stirring time may be controlled in a duration of about 10 seconds to about 30 minutes, more specifically about 30 seconds to about 25 minutes, far more specifically about 1 minute to about 20 minutes, far more specifically about 5 minutes to about 15 minutes, and far more specifically about 10 minutes.

In one aspect of the present invention, an oil-in-water type or a water-in-oil type pickering emulsion composition is prepared by the method as described above.

Advantageous Effects of Invention

The pickering emulsion stabilized by the polyimide particles according to the present invention has a very stable dispersed phase and does not cause flocculation, creaming, coalescence and phase separation even after a long time.

Further, the polyimide particles used in the present invention can be synthesized in a simple manner and have partial wettability without the surface treatment and pH control so that they can be easily used for the emulsion stabilization. Further, the present invention has an advantage of being capable of forming both an oil-in-water type emulsion and a water-in-oil type emulsion.

DESCRIPTION OF EMBODIMENTS

Figure 1:
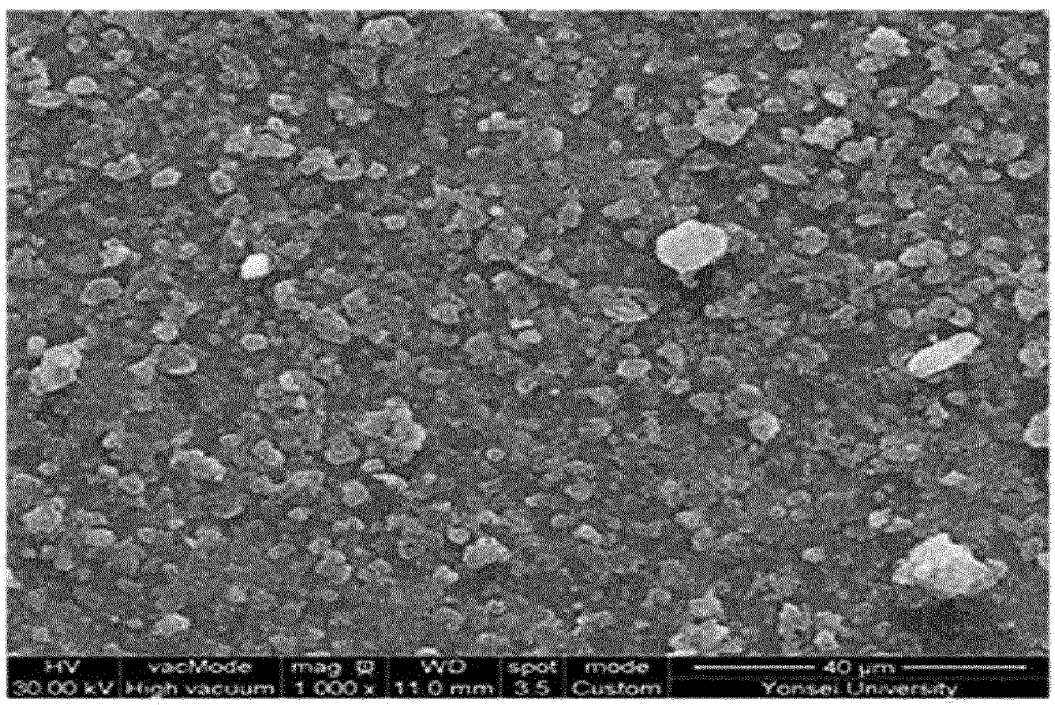
FIG. 1 illustrates an SEM image of the polyimide particles according to the present invention.
Figure 2:
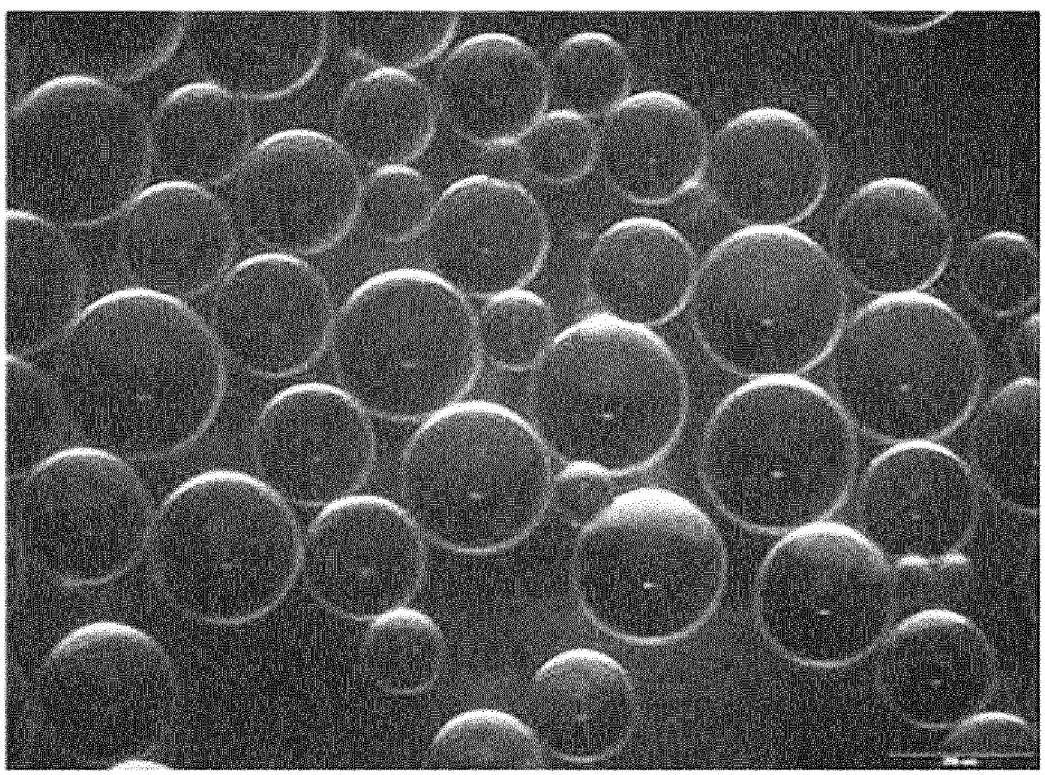
FIG. 2 illustrates a microscopic image of the pickering emulsion according to the present invention.

Hereinafter, the present invention will be described in more detail with reference to Examples. It should be understood, however, that the following Examples are intended to assist the understanding of the present invention and are not intended to limit the scope of the present invention.

Synthesis Example 1. Synthesis of Wholly Aromatic Polyimide (PMDA-ODA)

Pyromellitic dianhydride (PMDA, 1.09 g, 5.0 mmol) and 4,4'-oxydianiline (ODA, 1.00 g, 5.0 mmol) were dispersed in 20 mL distilled water as a dispersion medium in a 100 mL 2-neck round bottom flask which was substituted with nitrogen gas. Pyridine (2 mL, 25.0 mmol) as a catalyst and acetic anhydride (0.94 mL, 10.0 mmol) as a dehydrating agent were added thereto, and the mixture was reacted at 100° C. for 24 hours under reflux. The reaction mixture was filtered, and the obtained solid was washed with distilled water, acetone or methanol and vacuum-dried to obtain polymer powders. The synthesized polyimide particles were found to have C=O absorption bands of the imide group at 1775 cm$^{-1}$ and 1725 cm$^{-1}$, respectively, and C—N absorption band of the imide group at 1378 cm$^{-1}$, as a result of infrared absorption spectrum analysis.

Synthesis Example 2. Synthesis of Partially Aromatic Polyimide (HPMDA-ODA)

1,2,4,5-cyclohexanetetracarboxylic dianhydride (HPMDA, 1.12 g, 5.0 mmol) and 4,4'-oxydianiline (ODA, 1.00 g, 5.0 mmol) were dispersed in 20 mL distilled water as a dispersion medium in a 100 mL 2-neck round bottom flask which was substituted with nitrogen gas. Pyridine (2 mL, 25.0 mmol) as a catalyst and acetic anhydride (0.94 mL, 10.0 mmol) as a dehydrating agent were added thereto, and the mixture was reacted at 100° C. for 24 hours under reflux. The reaction mixture was filtered, and the obtained solid was washed with distilled water, acetone or methanol and vacuum-dried to obtain polymer powders.

Example 1. Preparation of an Oil-in-Water Type Pickering Emulsion Composition 0.1 g of the polyimide powder synthesized in Synthesis Example 1 and 50 mL of distilled water as a continuous phase were placed in a 100 mL beaker, and ultrasonic waves of 20 kHz were applied thereto for 30 minutes to uniformly disperse the polyimide particles therein. While the dispersion was stirred using a mechanical stirrer at 1,500 rpm, 8 mL of N-hexadecane, an oil phase, was added thereto, and the mixture was stirred for 10 minutes. When the stirring was stopped after 10 minutes, the N-hexadecane droplet was present in the form of an oil-in-water type emulsion with an average diameter of about 250 µm. It was confirmed that the pickering emulsion prepared using the polyimide particles was maintained for 7 days or more.

Example 2. Preparation of an Oil-in-Water Type Pickering Emulsion Composition 0.1 g of the polyimide powder synthesized in Synthesis Example 2 and 50 mL of distilled water as a continuous phase were placed in a 100 mL beaker, and ultrasonic waves of 20 kHz were applied thereto for 30 minutes to uniformly disperse the polyimide particles therein. While the dispersion was stirred using a mechanical stirrer at 1,500 rpm, 8 mL of N-hexadecane, an oil phase, was added thereto, and the mixture was stirred for 10 minutes. When the stirring was stopped after 10 minutes, the N-hexadecane droplet was present in the form of an oil-in-water type emulsion with an average diameter of about 250 µm. It was confirmed that the pickering emulsion prepared using the polyimide particles was maintained for 7 days or more.

Example 3. Preparation of a Water-in-Oil Type Pickering Emulsion Composition 0.1 g of the polyimide powder synthesized in Synthesis Example 1 and 50 mL of decalin (decahydronaphthalene) as a continuous phase were placed in a 100 mL beaker, and ultrasonic waves of 20 kHz were applied thereto for 30 minutes to uniformly disperse the polyimide particles therein. While the dispersion was stirred using a mechanical stirrer at 1,500 rpm, 8 mL of a distilled water was added thereto, and the mixture was stirred for 10 minutes. When the stirring was stopped after 10 minutes, the distilled water was present in the form of a water-in-oil type emulsion with an average diameter of about 250 µm. It was confirmed that the pickering emulsion prepared using the polyimide particles was maintained for 7 days or more.

Example 4. Preparation of a Water-in-Oil Type Pickering Emulsion Composition 0.1 g of the polyimide powder synthesized in Synthesis Example 2 and 50 mL of decalin (decahydronaphthalene) as a continuous phase were placed in a 100 mL beaker, and ultrasonic waves of 20 kHz were applied thereto for 30 minutes to uniformly disperse the polyimide particles therein. While the dispersion was stirred using a mechanical stirrer at 1,500 rpm, 8 mL of a distilled water was added thereto, and the mixture was stirred for 10 minutes. When the stirring was stopped after 10 minutes, the distilled water was present in the form of a water-in-oil type emulsion with an average diameter of about 250 µm. It was confirmed that the pickering emulsion prepared using the polyimide particles was maintained for 7 days or more.

Comparative Synthesis Example 1. Synthesis of Wholly Aromatic Polyimide (PMDA-ODA) Using an Organic Solvent 20 mL of N-methylpyrrolidone as an organic solvent was placed in a 100 mL 2-neck round bottom flask which was substituted with nitrogen gas. Pyromellitic dianhydride (PMDA, 1.09 g, 5.0 mmol) and 4,4'-oxydianiline (ODA, 1.00 g, 5.0 mmol) were added thereto, and the mixture was reacted at room temperature for 24 hours. Acetic anhydride (0.94 mL, 10.0 mmol) as a dehydrating agent and pyridine (0.8 mL, 25.0 mmol) as a catalyst were added to the solution, and the mixture was reacted at 160° C. for 6 hours under reflux to carry out an imidization reaction. The reaction was completed, and then the mixture was cooled to room temperature, followed by the reprecipitation using an excessive amount of ice water (distilled water). The precipitate was washed with distilled water, acetone or methanol and filtered, and the obtained solid was vacuum-dried to obtain polymer powders.

Comparative Synthesis Example 2. Synthesis of Partially Aromatic Polyimide (HPMDA-ODA) Using an Organic Solvent 20 mL of N-methylpyrrolidone as an organic solvent was placed in a 100 mL 2-neck round bottom flask which was substituted with nitrogen gas. 1,2,4,5-cyclohexanetetracarboxylic dianhydride (HPMDA, 1.12 g, 5.0 mmol) and 4,4'-oxydianiline (ODA, 1.00 g, 5.0 mmol) were added thereto, and the mixture was reacted at room temperature for 24 hours.

Acetic anhydride (0.94 mL, 10.0 mmol) as a dehydrating agent and pyridine (0.8 mL, 25.0 mmol) as a catalyst were added to the solution, and the mixture was reacted at 160° C. for 6 hours under reflux to carry out an imidization reaction. The reaction was completed, and then the mixture was cooled to room temperature, followed by the reprecipitation using an excessive amount of ice water (distilled water). The precipitate was washed with distilled water, acetone or methanol and filtered, and the obtained solid was vacuum-dried to obtain polymer powders.

Comparative Example 1. Preparation of an Oil-in-Water Type Pickering Emulsion Composition Using Wholly Aromatic Polyimide (PMDA-ODA) Synthesized with an Organic Solvent When 0.1 g of polyimide powder synthesized according to Comparative Synthesis Example 1 and 50 mL of distilled water as a continuous phase were placed in a 100 mL beaker, and the ultrasonic wave was applied thereto at 20 kHz for 30 minutes, the PMDA-ODA polyimide particles synthesized with an organic solvent were not dispersed uniformly in water, and most of it was precipitated. When the dispersion in which most of the polyimide particles were precipitated but only a portion of polyimide particles was dispersed was stirred at 1500 rpm and N-hexadecane, an oil phase, was added thereto, it resulted in poor emulsion stabilization. Even when the precipitated polyimide particles were removed by filtration and only the dispersion liquid was collected and tested, the emulsion stabilization was not achieved well.

Comparative Example 2. Preparation of an Oil-in-Water Type Pickering Emulsion Composition Using Partially Aromatic Polyimide (HPMDA-ODA) Synthesized with an Organic Solvent When 0.1 g of polyimide powder synthesized according to Comparative Synthesis Example 2 and 50 mL of distilled water as a continuous phase were placed in a 100 mL beaker, and the ultrasonic wave was applied thereto at 20 kHz for 30 minutes, the HPMDA-ODA polyimide particles synthesized with an organic solvent were not dispersed uniformly in water, and most of it was precipitated. When the dispersion in which most of the polyimide particles were precipitated but only a portion of polyimide particles was dispersed was stirred at 1500 rpm and N-hexadecane, an oil phase, was added thereto, it resulted in poor emulsion stabilization. Even when the precipitated polyimide particles were removed by filtration and only the dispersion liquid was collected and tested, the emulsion stabilization was not achieved well.

Comparative Example 3. Preparation of a Water-in-Oil Type Pickering Emulsion Composition Using Wholly Aromatic Polyimide (PMDA-ODA) Synthesized with an Organic Solvent When 0.1 g of polyimide powder synthesized in Comparative Synthesis Example 1 and 50 mL of decalin as a continuous phase were placed in a 100 mL beaker, and the ultrasonic wave was applied thereto at 20 kHz for 30 minutes, the PMDA-ODA polyimide particles synthesized with an organic solvent were not dispersed uniformly in decalin, and most of it was precipitated. When the dispersion in which most of the polyimide particles were precipitated but only a portion of polyimide particles was dispersed was stirred at 1500 rpm and distilled water was added thereto, it resulted in poor emulsion stabilization. Even when the precipitated polyimide particles were removed by filtration and only the dispersion liquid was collected and tested, the emulsion stabilization was not achieved well.

Comparative Example 4. Preparation of a Water-in-Oil Type Pickering Emulsion Composition Using Partially Aromatic Polyimide (HPMDA-ODA) Synthesized with an Organic Solvent When 0.1 g of polyimide powder synthesized in Comparative Synthesis Example 2 and 50 mL of decalin as a continuous phase were placed in a 100 mL beaker, and the ultrasonic wave was applied thereto at 20 kHz for 30 minutes, the HPMDA-ODA polyimide particles synthesized with an organic solvent were not dispersed uniformly in decalin, and most of it was precipitated. When the dispersion in which most of the polyimide particles were precipitated but only a portion of polyimide particles was dispersed was stirred at 1500 rpm and distilled water was added thereto, it resulted in poor emulsion stabilization. Even when the precipitated polyimide particles were removed by filtration and only the dispersion liquid was collected and tested, the emulsion stabilization was not achieved well.

Comparative Example 5-1. Preparation of an Oil-in-Water Type Pickering Emulsion Composition Using Polyimide Particles without Applying Ultrasonic Wave 0.1 g of the wholly aromatic polyimide particles (PMDA-ODA) prepared in Synthesis Example 1 was collected, and 50 mL of distilled water was added thereto. While the mixture was then stirred using a mechanical stirrer at 1,500 rpm without any additional ultrasonic wave applied, N-hexadecane as an oil phase was added thereto.

The polyimide particles were not uniformly dispersed in water, and thus the pickering emulsion stabilization by N-hexadecane was not completely achieved.

Comparative Example 5-2. Preparation of an Oil-in-Water Type Pickering Emulsion Composition Using Polyimide Particles without Applying Ultrasonic Wave 0.1 g of the partially aromatic polyimide particles (HPMDA-ODA) prepared in Synthesis Example 2 was collected, and 50 mL of distilled water was added thereto. While the mixture was then stirred using a mechanical stirrer at 1,500 rpm without any additional ultrasonic wave applied, N-hexadecane as an oil phase was added thereto.

The polyimide particles were not uniformly dispersed in water, and thus the pickering emulsion stabilization by N-hexadecane was not completely achieved.

Comparative Example 6-1. Preparation of a Water-in-Oil Type Pickering Emulsion Composition Using Polyimide Particles without Applying Ultrasonic Wave 0.1 g of the wholly aromatic polyimide particles (PMDA-ODA) prepared in Synthesis Example 1 was collected, and 50 mL of decalin was added thereto. While the mixture was then stirred using a mechanical stirrer at 1,500 rpm without any additional ultrasonic wave applied, distilled water was added thereto.

The polyimide particles were not uniformly dispersed in water, and thus the pickering emulsion stabilization by the distilled water was not completely achieved.

Comparative Example 6-2. Preparation of a
Water-in-Oil Type Pickering Emulsion Composition
Using Polyimide Particles without Applying
Ultrasonic Wave 0.1 g of the partially aromatic polyimide particles (HPMDA-ODA) prepared in Synthesis Example 2 was collected, and 50 mL of decalin was added thereto. While the mixture was then stirred using a mechanical stirrer at 1,500 rpm without any additional ultrasonic wave applied, distilled water was added thereto.

The polyimide particles were not uniformly dispersed in water, and thus the pickering emulsion stabilization by the distilled water was not completely achieved.

The invention claimed is:

1. A method of preparing a pickering emulsion composition, the method comprising:
   (a) dispersing and reacting a dianhydride compound and a diamine compound in water as a dispersion medium to obtain a polyimide;
   (b) putting the polyimide obtained in step (a) into a water phase which is a continuous phase and applying ultrasonic waves thereto so as to adjust an average particle diameter of the polyimide; and
   (c) adding and stirring an oil phase to the dispersion obtained in step (b).

2. A method of preparing a pickering emulsion composition, the method comprising:
   (a) dispersing and reacting a dianhydride compound and a diamine compound in water as a dispersion medium to obtain a polyimide;
   (b) putting the polyimide obtained in step (a) into an oil phase which is a continuous phase and applying ultrasonic waves thereto so as to adjust an average particle diameter of the polyimide; and
   (c) adding and stirring a water phase to the dispersion obtained in step (b).

3. The method according to claim 1, wherein in step (b), the ultrasonic waves are applied in 20 kHz to 100 kHz.

4. The method according to claim 1, wherein in step (b), the ultrasonic waves are applied for 10 minutes to 120 minutes.

5. The method according to claim 1, wherein in step (c), the average particle diameter of the polyimide in the dispersion obtained in step (b) is 10 nm to 20 µm.

6. The method according to claim 2, wherein in step (b), the ultrasonic waves are applied in 20 kHz to 100 kHz.

7. The method according to claim 2, wherein in step (b), the ultrasonic waves are applied for 10 minutes to 120 minutes.

8. The method according to claim 2, wherein in step (c), the average particle diameter of the polyimide in the dispersion obtained in step (b) is 10 nm to 20 µm.

* * * * *